United States Patent

Parviainen et al.

[11] Patent Number: 5,927,909
[45] Date of Patent: Jul. 27, 1999

[54] METHOD AND DEVICE FOR DRILLING HOLES INTO A MANTLE OF A CYLINDER OF A PAPER MACHINE

[75] Inventors: Seppo Parviainen, Kuopio; Jaakko Reivo, Jyväskylä; Jouko Pelkonen, Säynätsalo; Raimo Tolvanen, Jyväskylä, all of Finland

[73] Assignee: Valmet Corporation, Helsinki, Finland

[21] Appl. No.: 09/054,876

[22] Filed: Apr. 3, 1998

[30] Foreign Application Priority Data

Apr. 3, 1997 [FI] Finland .................................. 971366

[51] Int. Cl.⁶ .................................................. B23B 35/00
[52] U.S. Cl. ............................................. 408/1 R; 408/42
[58] Field of Search .............................. 408/1 R, 42, 53, 408/56, 61, 77, 79, 80, 81, 103, 110, 234

[56] References Cited

U.S. PATENT DOCUMENTS

| | | | |
|---|---|---|---|
| 2,546,957 | 3/1951 | Ray | 408/77 |
| 2,730,334 | 1/1956 | Sullivan | 408/77 |
| 3,732,025 | 5/1973 | Miles, Jr. et al. | 408/1 R |
| 3,822,958 | 7/1974 | Lewis | 408/53 |
| 3,977,804 | 8/1976 | Kitagawa | 408/42 |
| 4,106,880 | 8/1978 | Anders | 408/1 R |
| 4,493,595 | 1/1985 | Klein | 408/53 |
| 4,674,925 | 6/1987 | Thornton et al. | 408/1 R |
| 5,090,846 | 2/1992 | Hakala et al. | 408/1 R |
| 5,344,259 | 9/1994 | Rajala et al. | 408/46 |
| 5,676,498 | 10/1997 | Durney | 408/53 |

FOREIGN PATENT DOCUMENTS

| | | | |
|---|---|---|---|
| 0448947 | 10/1991 | European Pat. Off. | D21F 5/04 |
| 0545879 | 6/1993 | European Pat. Off. | B23B 39/16 |
| 91834 | 5/1993 | Finland . | |
| 9417944 | 8/1994 | WIPO | B23B 35/00 |

*Primary Examiner*—Andrea L. Pitts
*Assistant Examiner*—Adesh Bhargava
*Attorney, Agent, or Firm*—Steinberg & Raskin, P.C.

[57] ABSTRACT

A method for drilling holes into a mantle of a cylinder of a paper machine while the cylinder is in its site of operation in the paper machine. The holes are drilled into the cylinder mantle by a drilling device having drill bits and which is transferred after each drilling cycle to the next drilling position. When drilling the holes, the device is supported on cylinders placed adjacent to and above the cylinder to be machined and/or on the cylinder to be machined by fastening supports of the device. Before the drilling is started, the device is locked in its position by locking fastening supports in a desired position and, the holes are drilled into the cylinder placed underneath from the top toward the bottom. The device includes drill bits, a frame construction, a drive gear for transferring and rotating the drill bits during the drilling, fastening supports for supporting the device in its place in the drilling position against the cylinders placed above and adjacent to the cylinder to be machined and/or against the cylinder to be machined, and an actuator for locking the device in its place in the drilling position.

25 Claims, 3 Drawing Sheets

METHOD AND DEVICE FOR DRILLING HOLES INTO A MANTLE OF A CYLINDER OF A PAPER MACHINE

FIELD OF THE INVENTION

The present invention relates to a method for drilling holes into a mantle of a cylinder of a paper machine while the cylinder is in its site of operation in the paper machine. The holes are drilled into the cylinder mantle by a drilling device provided with drill bits and which is transferred after each drilling cycle to the next drilling position.

Also, the present invention relates to a drilling device for drilling holes into a mantle of a cylinder of a paper machine while the cylinder is in its site of operation in the paper machine. The device comprises a frame construction, drill bits rotatably mounted on the frame construction and a drive gear for transferring and rotating the drill bits during each drilling cycle.

BACKGROUND OF THE INVENTION

In the prior art, when effecting modifications to cylinders in a dryer group in a paper machine, e.g., machining drying cylinders, the drying cylinders were removed from their place and transferred away to be machined separately. Thus, in the prior art, it is known to convert ordinary non-perforated cylinders in a dryer group into so-called "Uno Vac" cylinders by making holes in the cylinder mantle. In the current assignee's Finnish Patent No. 91,135 (corresponding to U.S. Pat. No. 5,090,846, incorporated by reference herein), a method and a device are described by whose means the perforation of the cylinder mantle can be carried out on the site in the paper mill without removing the cylinder. In this arrangement, a drilling machine moves on support of separate guides in the axial direction of the roll. In the machining process, the drilling unit is supported both on the mantle face of the cylinder to be machined and on the mantle face of the adjacent cylinder. The equipment includes a spindle box of a multi-spindle drilling machine which comprises a unit for rotation of the drill bits and connected power transmission means for transferring the rotation to all of the adjacent drill bits at the same time. The equipment further comprises a cylinder by whose means the jig of the drill bits, i.e., the drill guide, is displaced into contact with the mantle face of the cylinder to be machined. In this case, since the equipment rests both against the cylinder to be machined and against this adjacent second cylinder, which constitutes a support base for the guides, a continuous, robust construction is formed during machining, which permits a drilling free of disturbance. The equipment comprises a spindle box movable in respect of the main frame and in this box, a separate motor for displacing the spindle box with its drills. Further, the equipment comprises a motor for rotating the drill bits. The drill bits are arranged to drill holes in a horizontal direction.

In the construction in accordance with Finnish Patent No. 91,135, the drill bits are placed in a fixed position in relation to one another. In such a case, the spacing of the grooves on the roll must also be fixed, because it is preferable that the perforations are placed expressly in the bottoms of the grooves. However, the spacing of grooves can vary from cylinder to cylinder.

With further respect to the prior art, reference is also made to the current assignee's Finnish Patent No. 91,834 (corresponding to U.S. Pat. No. 5,334,259, incorporated by reference herein), in which an arrangement is described for improving the method and the equipment in accordance with the Finnish patent mentioned above. In this improved arrangement, the spacing of adjacent drill bits in the drill equipment can be adjusted in a desired way.

It has been a drawback of the prior art constructions that the installation of the guides necessary for fastening of the drill guide has been time-consuming, and in some cases, there has not been enough space for fixing the guides to the cylinder adjacent to the cylinder to be drilled if a machine construction with dense spacing of cylinders is involved.

It is a further drawback of the prior art constructions that, in some cases, it has not been possible to carry out the drilling of the holes by means of the drill guide immediately from the edge of the cylinder, but the holes to be placed in the edge areas have had to be drilled manually.

It may be considered a further drawback in the prior art constructions that, when drilling takes place from the side (in a horizontal direction as in both Finnish patents referenced above) or from below (vertically upward), chips etc. may enter into the drill guide and cause problems and also, their removal is problematic.

OBJECTS AND SUMMARY OF THE INVENTION

Accordingly, an object of the present invention is to provide overall solutions for the problems and drawbacks mentioned above.

Another object of the present invention is further development of the prior art methods and constructions described above so that the fixing of a drilling device in connection with a cylinder to be machined is simpler and thus quicker than in the prior art arrangements.

It is a further object of the present invention to provide an arrangement in which drill chips do not disturb the operation of the device, in which the chips can also be vacuumed during drilling, and in which the edge areas of the cylinder can also be drilled.

In view of achieving the objects stated above and others, in the method in accordance with the invention, a drilling device for drilling holes is situated between a pair of cylinders and above another cylinder, which is the cylinder to be machined, and is supported on at least one of these cylinders by adjustable fastening supports. Before the drilling is started, the drilling device is locked in its position by means of an actuator by locking the fastening supports in the desired position. By means of the drill bits of the drilling device, holes are drilled into the cylinder placed underneath the drilling device in a vertical direction, i.e., from the top towards the bottom.

The drilling device in accordance with the invention is situated between a pair of cylinders and above another cylinder, which is the cylinder to be machined, and comprises a frame construction, rotatable drill bits mounted on the frame construction and fastening supports for supporting the frame construction in its place in the drilling position against at least one of these cylinders. The device also comprises an actuator for locking the frame construction in its place in the drilling position.

By means of the method and device in accordance with the invention, a shorter time is needed for fastening the drilling device to the supporting cylinder(s) and as a result of the shorter fastening time, economies of time amounting to several hours are obtained per cylinder to be drilled and, moreover, during drilling, it is possible to work on the adjacent cylinders, for example to replace the ends or to carry out other maintenance operations. In the arrangement and method in accordance with the invention, the drilling via the drill bits takes place downward, in which case the drill chips etc. do not cause problems.

The device in accordance with the invention rests either on support of the cylinders placed above and adjacent to the cylinder to be drilled, i.e., on support of the cylinders in an upper row, or on support of the cylinder to be drilled, which is in a lower row, and the upper, adjacent cylinders without separate guides, in which case the edge areas of the cylinder can also be drilled as the equipment can move substantially over the entire length of the cylinder. The device drills the holes from the top toward the bottom, and the drills are attached to the drill guide by means of a tightening bushing. During transfer of the device, the device rests on support of wheels arranged at the ends of the fastening supports of the device, which wheels are preferably spring-loaded and rest on the upper adjacent cylinders or on the cylinder to be drilled. The device is tightened and locked in its place in the drilling position by means of an actuator, preferably a pneumatic cylinder.

It is possible to attach the device to cylinder gaps of different widths, because the fastening supports of the device can be extended owing to their telescopic nature, i.e., the length of the fastening supports is adjustable to extend entirely across the gap between the adjacent supporting cylinders. If necessary, for special locations, separate fastening means can be attached in connection with the device. Further, if necessary, the device can be attached to the guides in accordance with the current assignee's patents of earlier dates currently in use.

The drill guide plate in the device is provided with a guide pin or wheel, which guides the drill device to the correct location in relation to a groove, and further, the drill guide plate is provided with lubricant ducts in order to lubricate the drill bits. Preferably, each spindle box includes 15 drills but, if necessary, the number of drills can be increased. The distance between the drills is fixed or adjustable in the way described in the current assignee's earlier patents. The drills are preferably attached to the guide plate by means of a tightening chuck.

One of the most important advantages of the method and the device in accordance with the invention is achieved in the form of speed of installation and in the form of speed of the drilling process. The device is easy to install, and it is suited for a number of different gaps between rolls.

The invention will be described in detail with reference to some preferred embodiments of the invention illustrated in the figures in the accompanying drawing. However, the invention is not confined to the illustrated embodiments alone.

BRIEF DESCRIPTION OF THE DRAWINGS

Additional objects of the invention will be apparent from the following description of the preferred embodiment thereof taken in conjunction with the accompanying non-limiting drawings, in which.

DETAILED DESCRIPTION OF THE PREFERRED EMBODIMENTS

Figure 1:
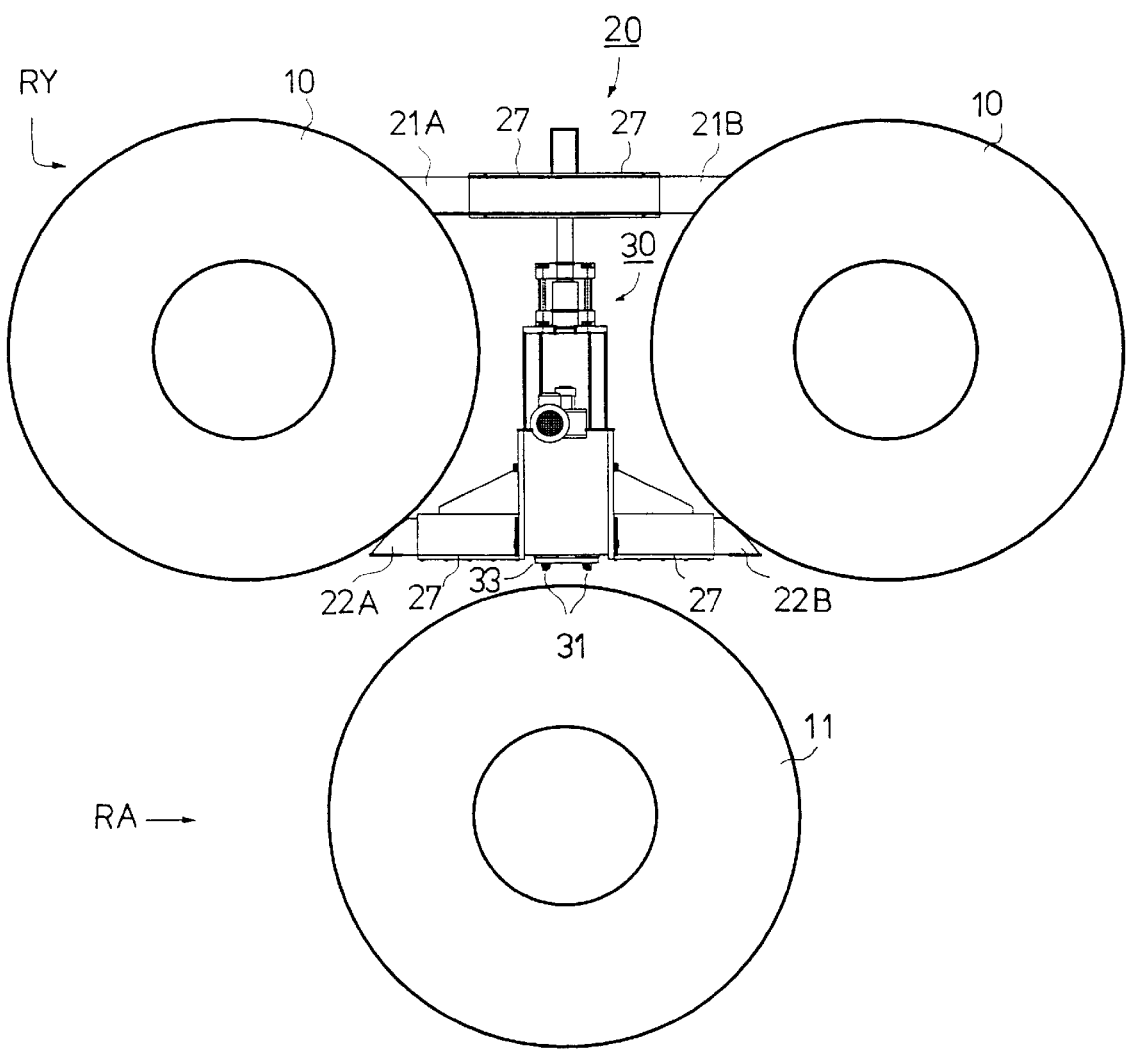
FIG. 1 is a schematic illustration of a device in accordance with the invention in a machining situation between cylinders and which is used in a method in accordance with the invention.
Figure 3:
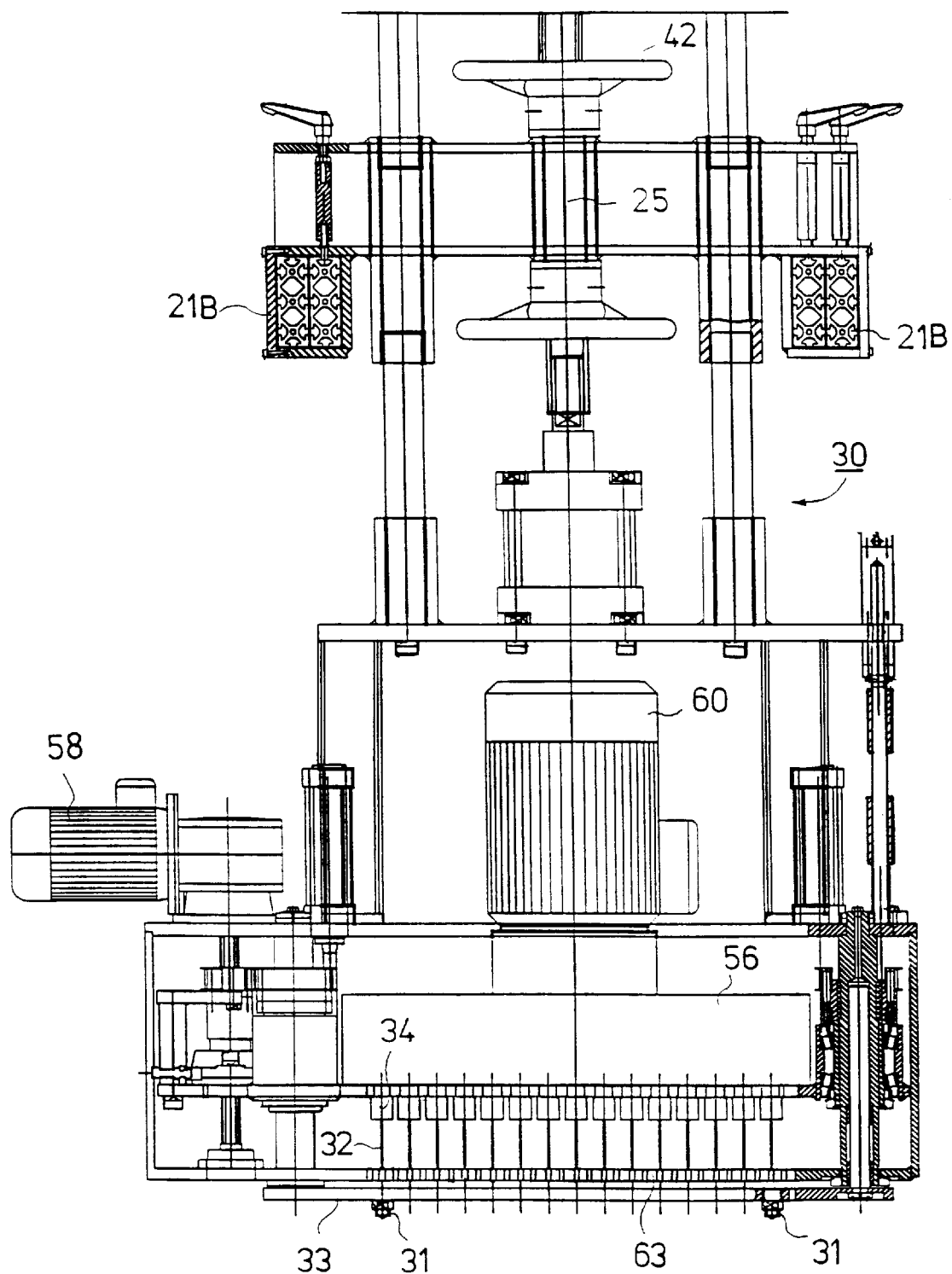
FIG. 3 is a schematic illustration of a device in accordance with the invention provided with drills and which is used in a method in accordance with the invention.

Referring to the accompanying drawings wherein like reference numerals refer to the same or similar elements, as shown in FIG. 1, a drilling device 20 is arranged in a space between adjacent cylinders 10 in an upper row RY of cylinders and above a cylinder 11 arranged in a lower row RA of cylinders below a gap between the cylinders 10, cylinder 11 being the cylinder to be drilled. Cylinders arranged in this type of arrangement are often considered to be in an interlocking relationship. The drilling device 20, which is also referred to as a drill guide, rests on support of the cylinders 10 in the upper row RY by means of fastening supports 21A,21B,22A and 22B. The fastening supports 21A,21B,22A,22B are of telescopic construction 27, i.e., adjustable to different lengths, and therefore they can be fixed to cylinder gaps of different widths. Drilling device 20 includes a frame or frame construction 30 on which the devices needed for drilling holes on the mantle of cylinder 11 are mounted, e.g., guide pins 31 for guiding the drilling of the holes via drill bits 32 (FIG. 3). The fastening supports 21A–22B of the drilling device 20 are attached to each vertical end of the frame construction 30, i.e., an upper end and a lower end, and they extend in the horizontal direction to the adjacent cylinders 10.

Figure 2:
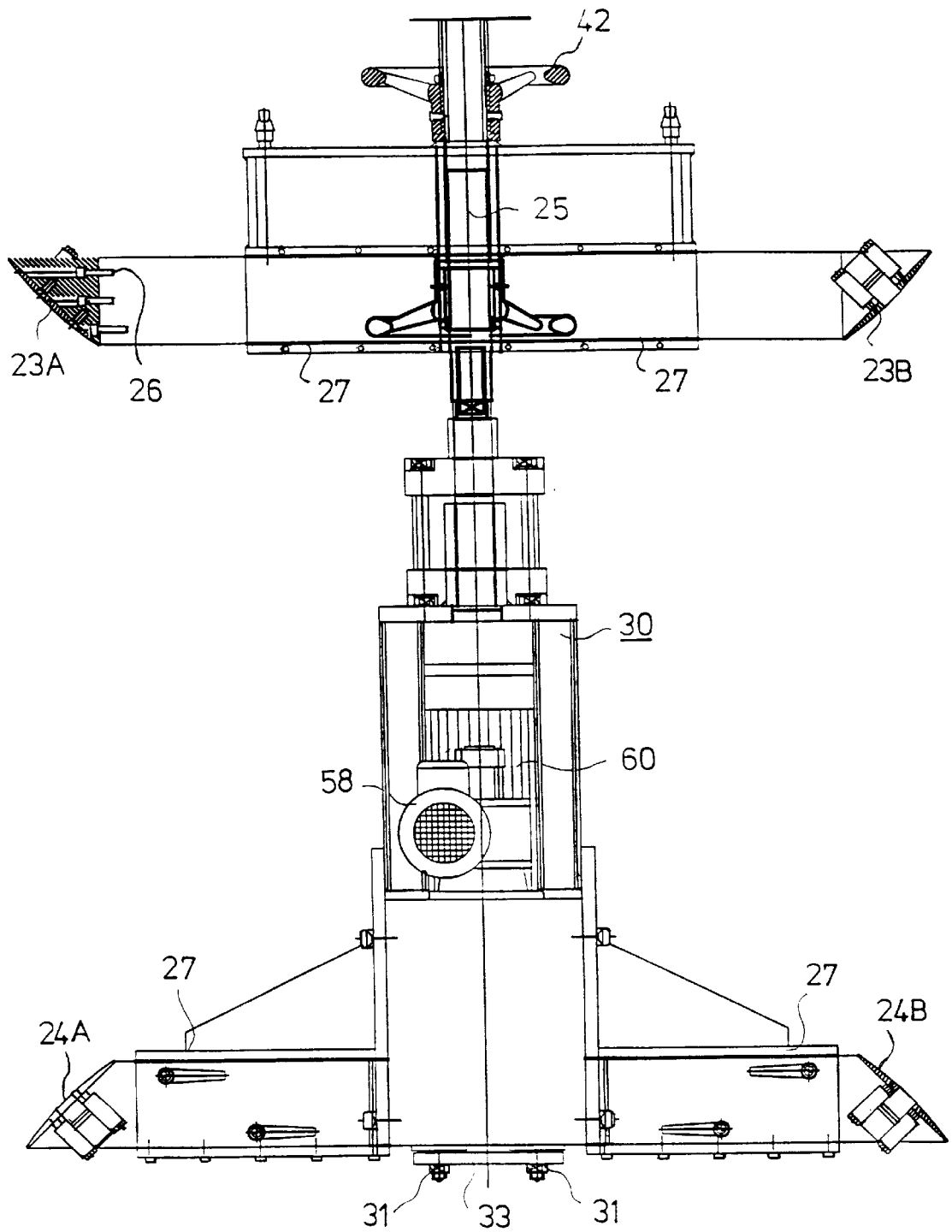
FIG. 2 is a schematic illustration in more detail of a device in accordance with the invention and which is used in a method in accordance with the invention.

FIG. 2 is a more detailed illustration of the drilling device 20 in accordance with the invention, and as shown therein, spring-loaded wheels 23A,23B,24A,24B are attached to the end of each fastening support 21A–22B. The springs of the wheels 23A–24B are denoted by reference numeral 26. The device 20 is shifted in a longitudinal or axial direction of cylinder 11 on support of the wheels 23A–24B to each desired drilling position, after which the device 20 is tightened and locked in its position by means of an actuator, preferably a pneumatic cylinder 25.

By means of drill bits 32 arranged in connection with the frame 30, holes are drilled into the bottom of the groove provided in the mantle of the cylinder 11. Each set of holes drilled while the drilling device 20 is at a specific position is considered a drilling cycle. While drilling the holes, lubricant for the drilling is passed through a guide plate 33 of the drilling device 20 to the holes. After the drilling device 20 has been transferred to its place between the cylinders 10, it is set in the desired drilling position, tightened and locked in its place. After the holes corresponding to one revolution of the cylinder have been drilled into the cylinder 11 to be perforated, i.e., the drilling cycle is completed, the pneumatic cylinder 25 is opened, and the device 20 is transferred in the longitudinal (axial) direction of the cylinders 10, 11 to the next drilling position to begin another drilling cycle.

As shown in FIG. 3, the drill bits 32 are attached to the frame 30 by means of a tightening chuck 34, in which case replacing of the drills 32 is relatively quick. Most appropriately, drills for long holes are used, in which case a good extension is achieved. The position of the drilling device 20 can be adjusted in the vertical direction manually, for example, by means of the wheel 42 as close to the cylinder 11 to be drilled as possible in order that the desired drilling quality could be obtained. In this manner, the relative distance between the drilling device 20 and the mantle of cylinder 11 is controlled. The guide plate 33 of the guide 20 is provided with lubricant ducts 63 for enabling lubrication of the drill bits 32.

The drilling device 20 also comprises a spindle box 56, to which a motor 58 for rotating the drill bits 32 is attached, motor 58 being motively coupled to drill bits 32. The rotation motor 58 is arranged to rotate all of the drill bits 32 at the same time. The spindle box 56 further comprises a motor 60 attached to it, by means of which motor 60, the spindle box 56 and the related drill bits 32 are displaced in order to produce a feed movement for the drill bits 32 and to shift the drill bits apart from the roll mantle to be drilled after the drilling. The drilling operations with the device now being discussed and the related arrangements can be accomplished in compliance with the principles described in the current assignee's Finnish Patent Nos. 91,135 and 91,834 or in any other way in itself known to a person skilled in the art.

The device 20 includes a number of drills 32, for example 15 drills, but the number of drill bits may be selected as desired. In the exemplifying embodiment shown in FIGS. 1–3, the spacing of the drill bits 32 is fixed. The arrangement may also be adjustable in accordance with Finnish Patent No. 91,834.

Above, some preferred embodiments of the invention have been described, and it is obvious to a person skilled in the art that numerous modifications can be made to these embodiments within the scope of the inventive idea defined in the accompanying patent claims. As such, the examples provided above are not meant to be exclusive. Many other variations of the present invention would be obvious to those skilled in the art, and are contemplated to be within the scope of the appended claims.

We claim:

1. A method for drilling holes into a mantle of a cylinder of a paper machine while the cylinder is in its site of operation in the paper machine, comprising the steps of:

supporting a drilling device on at least one of a first supporting cylinder, a second supporting cylinder spaced from the first supporting cylinder and the cylinder to be drilled situated below a gap between the first and second supporting cylinders, the drilling device being supported on the at least one of the first supporting cylinder, the second supporting cylinder and the cylinder to be drilled by means of fastening supports engaging with the at least one of the first supporting cylinder, the second supporting cylinder and the cylinder to be drilled, the drilling device including drill bits, locking the drilling device in a fixed position relative to the cylinder to be drilled by locking the fastening supports against the at least one of the first supporting cylinder, the second supporting cylinder and the cylinder to be drilled and such that the drill bits are operative in a downward direction, and pressing said drill bits into the mantle of the cylinder to be drilled and rotating said drill bits to thereby drill holes in the cylinder mantle.

2. The method of claim 1, wherein the drilling device is supported on the first supporting cylinder and the second supporting cylinder by means of the fastening supports engaging with the first supporting cylinder and the second supporting cylinder, and the drilling device is locked in the fixed position relative to the cylinder to be drilled by locking the fastening supports against the first supporting cylinder and the second supporting cylinder.

3. The method of claim 1, wherein the fastening supports have an adjustable length, said step of locking the drilling device comprises the steps of providing the drilling device with an actuator coupled to the fastening supports, and operating the actuator to adjust the length of the fastening supports until the fastening supports engage the at least one of the first supporting cylinder, the second supporting cylinder and the cylinder to be drilled on which the drilling device is supported.

4. The method of claim 1, further comprising the step of:
   transferring the drilling device to additional fixed positions relative to the cylinder to be drilled.

5. The method of claim 4, wherein said step of transferring the drilling device comprises the steps of arranging spring-loaded wheels on the fastening supports and shifting the drilling device on support of the spring-loaded wheels to the additional positions.

6. The method of claim 4, wherein said step of transferring the drilling device comprises the step of displacing the drilling device in a direction of a longitudinal axis of the cylinder to be drilled.

7. The method of claim 1, further comprising the step of:
   rotating the cylinder to be drilled while the drilling device is locked in its position over a certain angular distance so as to drill the holes into a circumferential portion of the cylinder mantle.

8. A device for drilling holes into a mantle of a driving cylinder of a paper machine while the drying cylinder is in its site of operation in the paper machine, comprising
   a frame,
   drill bits mounted on said frame,
   means for transferring and rotating said drill bits arranged in connection with said frame,
   fastening supports coupled to said frame and adapted to support said frame on at least one of a first drying cylinder, a second drying cylinder spaced from the first cylinder and the cylinder to be drilled situated below a gap between the first and second cylinders while the cylinder to be drilled is in its site of operation in the paper machine, and
   locking means arranged on said frame for locking said frame in a fixed drilling position relative to the cylinder to be drilled.

9. The device of claim 8, wherein said fastening supports have an adjustable length, said locking means being structured and arranged to lock said fastening supports at a fixed length.

10. The device of claim 8, wherein said fastening supports are adapted to support said frame on said at least one of the first cylinder, the second cylinder and the cylinder to be drilled such that said drill bits are operative in a downward direction.

11. The device of claim 8, wherein said fastening supports are adapted to support said frame on the first drying cylinder and the second drying cylinder.

12. The device of claim 11, comprising four of said fastening supports arranged in pairs at each vertical end of said frame such that two of said fastening supports are adapted to rest against each of the first and second cylinders.

13. The device of claim 8, wherein said locking means comprise an actuator.

14. The device of claim 8, further comprising
    spring-loaded wheels attached to said fastening supports for transferring said frame in a longitudinal direction of the cylinder to be drilled from one drilling position to additional drilling positions.

15. The device of claim 8, wherein said fastening supports have a telescopic construction.

16. The device of claim 8, wherein said locking means comprise a pneumatic cylinder.

17. The device of claim 8, further comprising
    a guide plate mounted to said frame and including lubricant ducts for enabling flow of lubricant to said drill bits.

18. The device of claim 8, wherein said fastening supports are arranged to guide movement of said frame in an axial direction of the cylinder to be drilled, said locking means being arranged to lock said fastening supports to prevent movement of said frame.

19. In a paper machine including first and second drying cylinders spaced from one another, and a third drying cylinder situated below a gap between said first and second drying cylinders, an arrangement for drilling holes into a mantle of said third cylinder while said third cylinder is in its site of operation in the paper machine comprising a frame arranged in said gap, drill bits mounted on said frame, means for transferring and rotating said drill bits arranged in connection with said frame, fastening supports coupled to said frame and for supporting said frame on at least one of said first drying cylinder, said second drying cylinder and said third cylinder, and locking means arranged on said frame for locking said frame in a fixed drilling position relative to said third cylinder.

20. The arrangement of claim 19, wherein said fastening supports are structured and arranged to support said frame on said at least one of said first cylinder, said second cylinder and said third cylinder such that said drill bits are operative in a downward direction.

21. The arrangement of claim 19, wherein said fastening supports are structured and arranged to support said frame on said first cylinder and said second cylinder.

22. A device for drilling holes into a mantle of a cylinder of a paper machine while the cylinder is in its site of operation in the paper machine, comprising a frame, drill bits mounted on said frame, means for transferring and rotating said drill bits arranged in connection with said frame, fastening supports coupled to said frame and adapted to support said frame on at least one of a first cylinder, a second cylinder spaced from the first cylinder and the cylinder to be drilled situated below a gap between the first and second cylinders, said fastening supports having an adjustable length, and locking means arranged on said frame for locking said fastening supports at a fixed length and thereby lock said frame in a fixed drilling position relative to the cylinder to be drilled.

23. The device of claim 22, wherein said fastening supports have a telescopic construction.

24. A device for drilling holes into a mantle of a cylinder of a paper machine while the cylinder is in its site of operation in the paper machine, comprising a frame, drill bits mounted on said frame, means for transferring and rotating said drill bits arranged in connection with said frame, four fastening supports coupled to said frame and adapted to support said frame on a first cylinder and a second cylinder spaced from the first cylinder, the cylinder to be drilled being situated below a gap between the first and second cylinders, said fastening supports being arranged in pairs at each vertical end of said frame such that two of said fastening supports are adapted to rest against each of the first and second cylinders, and locking means arranged on said frame for locking said frame in a fixed drilling position relative to the cylinder to be drilled.

25. A device for drilling holes into a mantle of a cylinder of a paper machine while the cylinder is in its site of operation in the paper machine, comprising a frame, drill bits mounted on said frame, means for transferring and rotating said drill bits arranged in connection with said frame, fastening supports coupled to said frame and adapted to support said frame on at least one of a first drying cylinder, a second drying cylinder spaced from the first cylinder and the cylinder to be drilled situated below a gap between the first and second cylinders, and locking means arranged on said frame for locking said frame in a fixed drilling position relative to the cylinder to be drilled, said locking means being selected from a group consisting of an actuator and a pneumatic cylinder.

* * * * *